(12) United States Patent
Vanhinsbergh (10) Patent No.: US 6,241,645 B1
(45) Date of Patent: Jun. 5, 2001

(54) METHOD AND APPARATUS FOR CHANGING OPERATING MODULES

(75) Inventor: Gregory S Vanhinsbergh, Bristol (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 09/462,708

(22) PCT Filed: May 22, 1999

(86) PCT No.: PCT/GB99/01603

§ 371 Date: Jan. 12, 2000

§ 102(e) Date: Jan. 12, 2000

(87) PCT Pub. No.: WO99/61199

PCT Pub. Date: Dec. 2, 1999

(30) Foreign Application Priority Data

May 22, 1998 (GB) .................................................. 9810970
Nov. 5, 1998 (GB) .................................................. 9824296

(51) Int. Cl.[7] .............................. B23Q 3/157; B23P 19/04
(52) U.S. Cl. ................................. 483/1; 211/1.54; 483/54; 483/58; 483/59
(58) Field of Search ................................. 483/54, 55, 56, 483/57, 58, 59, 62, 902, 1; 211/1.54; 408/35; 29/39, 40

(56) References Cited

U.S. PATENT DOCUMENTS

| | | | |
|---|---|---|---|
| 3,191,260 | * 6/1965 | Jorgensen | 483/56 |
| 4,050,837 | 9/1977 | Shichida et al. | 29/40 |
| 4,069,918 | * 1/1978 | Inoue et al. | 24/1.5 |
| 4,831,721 | * 5/1989 | Hirai et al. | 483/902 |
| 5,201,696 | * 4/1993 | Kinback et al. | 483/54 |

FOREIGN PATENT DOCUMENTS

| | | | |
|---|---|---|---|
| 0 060 638 A2 | 9/1982 | (EP) . | |
| 2555927 | * 6/1985 | (FR) | 483/55 |
| 52-10981 | * 1/1977 | (JP) | 483/56 |
| 8905210 | * 6/1989 | (WO) | 483/54 |
| WO 99/56901 | 11/1999 | (WO) . | |

* cited by examiner

Primary Examiner—William Briggs
(74) Attorney, Agent, or Firm—Oliff & Berridge, PLC (57) ABSTRACT

A magazine which retains tools within the working area of a machine tool has a storage port which is mounted to a base via a compliant mount which provides two degrees of rotational freedom, and two degrees of translational freedom. The mount enables the storage port to be brought into register with a chuck on the spindle of the machine as a result of mutual engagement between surfaces on the storage port and the chuck during a tool change operation. The tool is retained within the chuck by using hydraulic pressure chambers in the chuck to deform an interior wall of the chuck cavity, and thereby causing it to grip the sides of the tool. Such a retention mechanism requires a relatively small clearance of the tool within the chuck when the wall is underformed, thereby necessitating the compliantly mounted storage port and alignment surfaces.

10 Claims, 7 Drawing Sheets

METHOD AND APPARATUS FOR CHANGING OPERATING MODULES

The present invention relates to the changing of operating modules, such as probes, tool units or end effectors, on a coordinate positioning machine, such as a coordinate measuring machine, a machine tool, or a robot.

In our co-pending International patent application PCT/GB99/01215 we disclosed a system in which operating modules in the form of tool units are releasably coupled to the spindle of a machine tool by means of frictional engagement between the shank of the tool and the interior wall of a cavity within a chuck mounted on the spindle. In this disclosure, frictional engagement between the tool shank and the cavity wall is controlled by varying the hydraulic pressure within fluid chambers located within the chuck adjacent the cavity wall, causing the cavity wall to deflect elastically and grip or release the tool as appropriate. In accordance with this disclosure, other methods of controlling the frictional engagement between the cavity wall and the tool shank to retain a tool unit releasably within a chuck are contemplated, such as shrink-fitting by means of rapid and temporary localised heating of the chuck to allow insertion of the tool shank within the chuck, followed by rapid cooling of the chuck to cause the cavity wall to grip the tool shank as it contracts.

Tool-changing systems of the type disclosed in PCT/GB99/01215 have the advantage that the both the tool units and the chucks are light, and have a relatively simple construction. All of the relatively heavy connectors and/or other mechanical interfaces which are traditionally part of the tool unit, such as collets, taper shanks and pull-up studs, are dispensed with, along with the mechanisms which retract the tool units within the chuck during tool changing, and then retain them within the chuck during machining. This reduction in the mass carried by the spindle during machining is particularly significant on machine tools where the spindle is driven relative to stationary workpieces.

However, a requisite of such an improved tool changing system is that the clearance between the tool shank and the chuck cavity wall must be relatively small when the chuck is in its "open" state, i.e. the cavity wall is in a condition to receive the tool shank (for example by virtue of instant heating in the shrink-fit chuck system, or low hydraulic pressure in the hydraulic system). In some systems the clearance is as small as 10 microns. As a result of this requirement, relatively precise alignment of the chuck and the tool is required during tool changing.

A first aspect of the present invention provides a magazine for storing operating modules on a coordinate positioning machine to enable automated exchange of one operating module for another, the magazine having a base, by means of which it may be mounted to the machine, and at east one storage port containing an operating module, the storage port being mounted to the base by a compliant mount which provides at least two degrees of rotational freedom of the storage port relative to the base of the magazine, thereby to enable the operating module within the storage port to adopt the attitude required to enable its insertion in the chuck cavity during an exchange of operating modules. Preferably, the compliant mount permits motion of the storage port relative to the base with two rotational and two translational degrees of freedom.

In one embodiment of magazine, the storage port is supported on the base of the magazine by a pair of serially mounted gimbals, such as ball joints, for example.

In order to achieve the requisite alignment of the operating module within the storage port, and the chuck on the coordinate positioning machine, a further independent aspect of the invention provides mutually engageable alignment surfaces connected to the chuck and the storage port, engagement of which as the chuck and the storage port approach during an exchange operation will automatically cause the operating module within the storage port and the chuck cavity to attain alignment by virtue of the relative motion between the storage port and the base of the magazine permitted by the compliant mount.

Preferably, two pairs of mutually engageable alignment surfaces are provided, wherein a first pair are mutually engageable to provide a first and relatively coarse degree of alignment between the operating module and the chuck cavity, and a second pair of surfaces which are mutually engageable subsequent to engagement of the first pair of surfaces to provide a second and relatively fine degree of alignment between the operating module and the chuck cavity. In one embodiment, a pair of alignment surfaces are provided by surfaces on the storage port and the exterior of the chuck, while in a further embodiment a pair of surfaces is provided by a surface on the operating module and a surface at the mouth of the chuck cavity. In a further embodiment, both pairs of surfaces are on the storage port and the chuck, and in yet a further embodiment a single alignment surface serves as an alignment surface of both the first and the second pair of alignment surfaces.

Yet a further independent aspect of the present invention provides a method of operating a coordinate positioning machine having a chuck supported on one relatively moveable part of the machine which has a cavity within which an operating module may be releasably retained, and a magazine supported on a further relatively moveable part of the machine having at least one storage port containing an operating module, the method comprising the steps of: operating the machine to cause the magazine and chuck to approach, and during the approach, engaging mutually engageable alignment surfaces on the chuck and the storage port;

allowing the storage port to move relative to the one relatively moveable part of the machine as a result of forces exerted by engagement of the alignment surfaces during the approach, thereby to bring the operating module and the chuck into a predetermined alignment;

operating the machine to move the first and second relatively moveable parts to insert the operating module within the cavity;

subsequent to the insertion of the operating module within the cavity, causing the cavity wall to grip the operating module and thereby retain the operating module within the chuck by virtue of frictional engagement between the operating module and the cavity wall; and with the operating module retained within the chuck, operating the machine to move the first and second relatively moveable parts to remove the operating module from the storage port.

In the foregoing description, reference has been made to the general applicability of the invention to all forms of coordinate positioning machine, and all types of operating module. Subsequent exemplification of the invention will be by reference to its applicability in relation to the field of tool changing on a machine tool, however no derogation from the general applicability of the invention is intended by this.

Embodiments of the invention will now be described, by way of example, and with reference to the accompanying drawings in which.

Figure 1A:
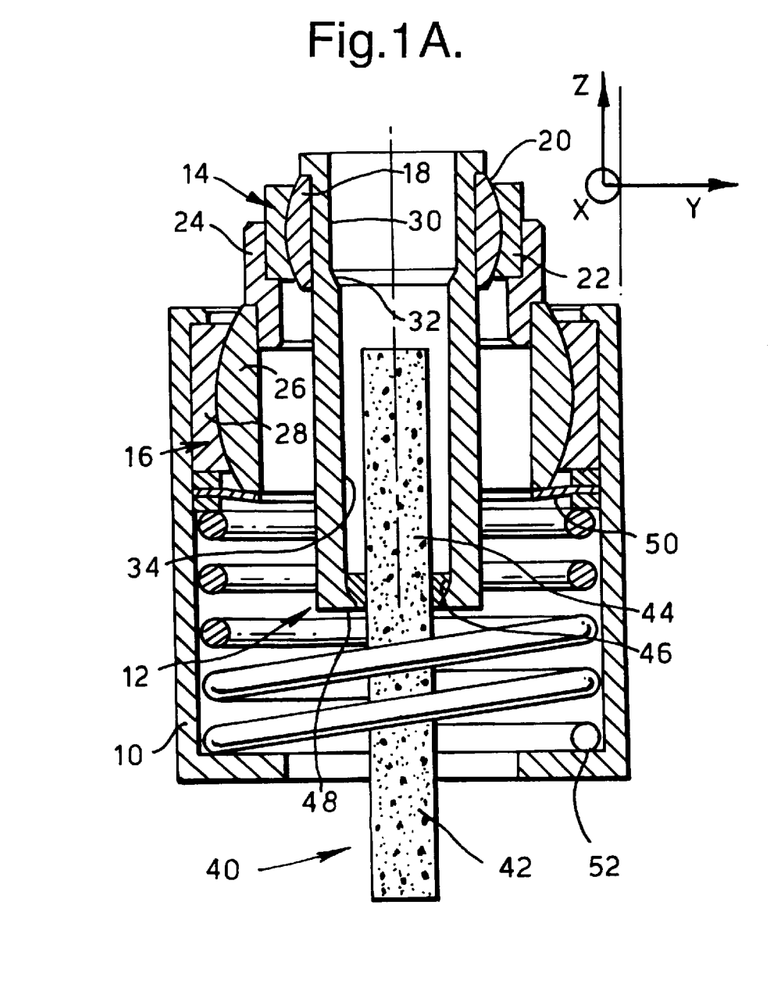
FIGS. 1A and 1B are sections through an embodiment of tool change apparatus according to the present invention.
Figure 1B:
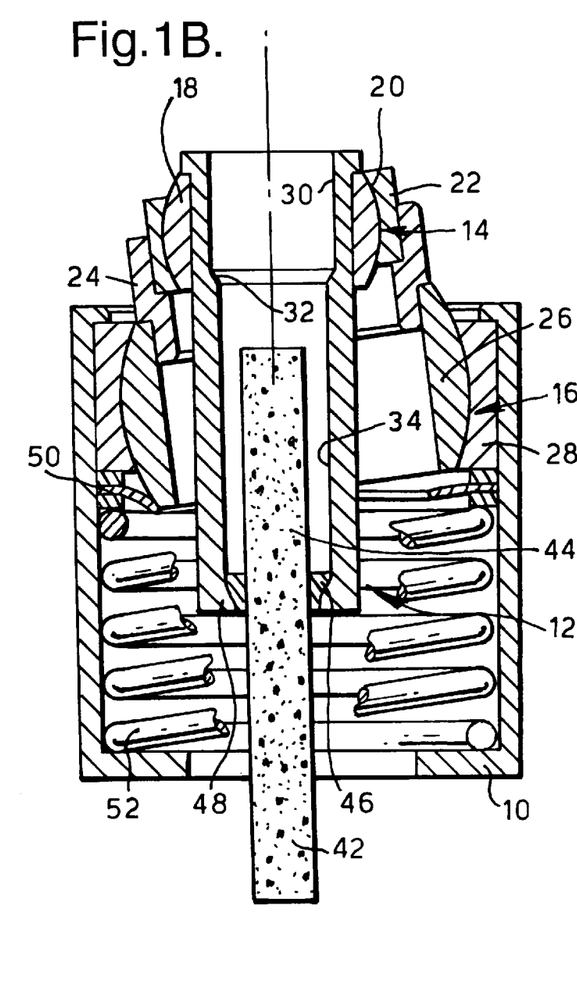

Referring now to FIGS. 1A and 1B, a magazine for one or more cutting tools includes a base provided by a cylindrical housing 10, within which is supported one or more tool storage ports 12, which, in the illustrated embodiment, have a tubular shape. A storage port 12 is mounted to the base 10 via a compliant mount which permits relative lateral movement of the storage port 12 and base 10 in the x and y directions, as well as relative angular movement about the x and y axes. In the illustrated embodiment, the mechanism of the compliant mount providing such movement comprises a pair of serially mounted gimbals 14,16, here having the form of ball-joints. The first of the two ball-joints 14,16 includes a sleeve 18, mounted to the upper neck of the storage port 12, and having a spherical outer surface 20, which rotates relative to a bearing collar 22, in turn supported on an intermediate structural collar 24. A second bearing sleeve 26, mounted to the lower end of the intermediate structural collar 24 rotates within a concave bearing sleeve 28, which is in turn fixedly connected to the base 10 of the magazine.

A tool unit, which in the present example is merely a tool 40, is retained within the storage port, and comprises a cutting element, which in this case is a drill 42, integrally formed upon a cylindrical shaft 44, known as a tool shank, by means of which the tool 40 is retained within the spindle of a machine tool. The tool also includes a locating collar 46, whose outer profile co-operates with a correspondingly configured flange 48, formed in the lower part of the interior of the storage port 12, to locate the tool 40 within the storage port 12. The storage port is biased into a neutral, substantially upright position by a means of a resilient biasing ring or washer 50, secured to the housing 10 at its outer perimeter by a coil spring 52, and whose inner perimeter bears against the lower face of the second bearing sleeve 26.

Figure 2:
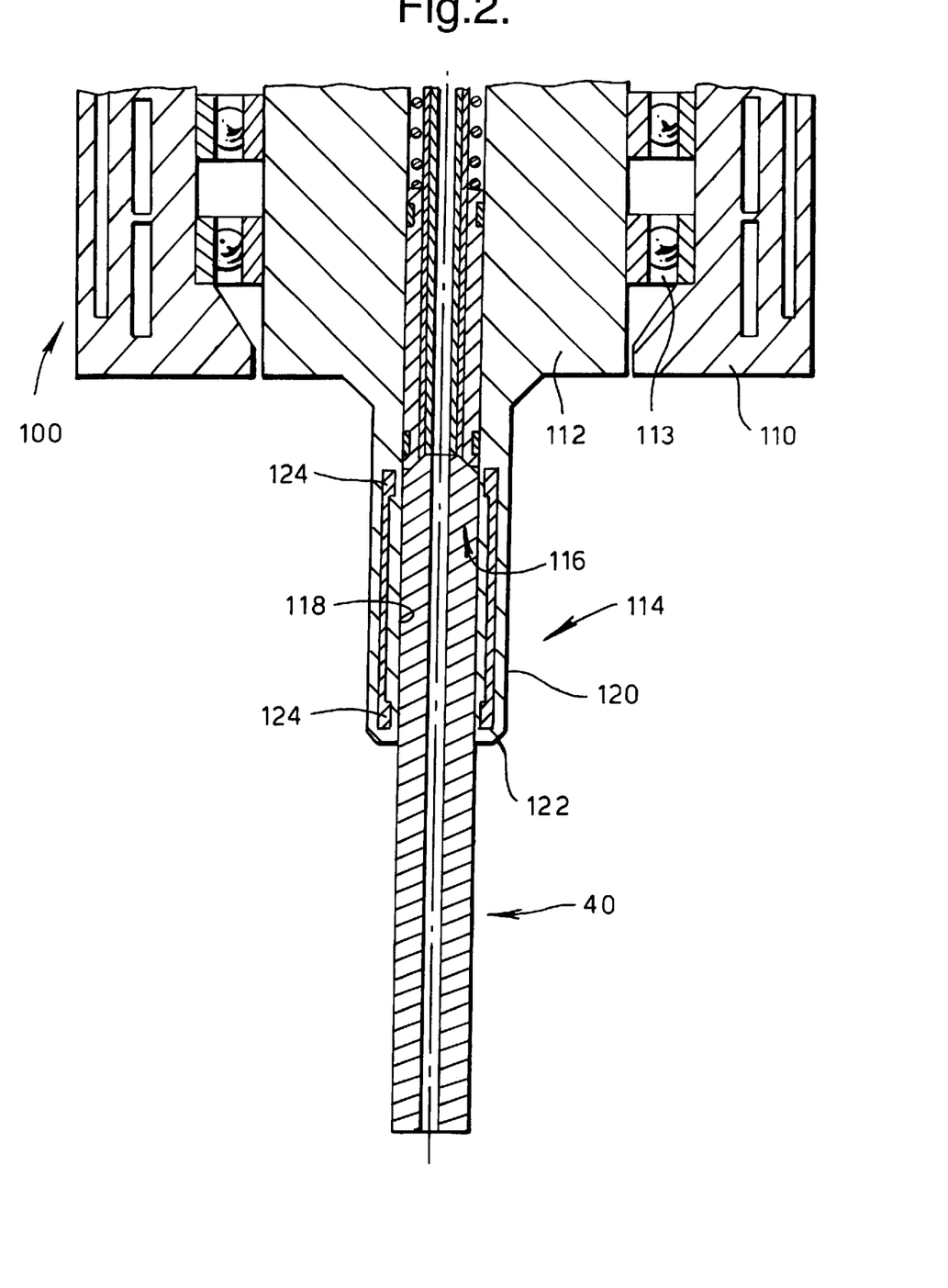
FIG. 2 is a section through a machine tool spindle of the type which may be used in conjunction with the embodiments illustrated in FIGS. 1 and 2.

Referring now to additionally to FIG. 2, a spindle of a machine tool upon which the magazine of FIG. 1 is to be employed will now be described. The spindle 100 includes a housing 110 relative to which a shaft 112 is journalled for rotation by means of bearings 113. A chuck 114 is integrally formed on the spindle shaft 112 and has a substantially cylindrical configuration with an internal cylindrical cavity 116, within which the tool shank 44 of the tool is retained. A frictional engagement between the tool shank 44 and the interior wall 118 of chuck cavity 116 is controlled by varying the hydraulic pressure within two annular hydraulic chambers 124, which are provided in the body of the chuck 114. Variation in hydraulic pressure is controlled by means of an actuating mechanism, such as an actuating mechanism of the type disclosed in our co-pending International Patent Application PCT/GB99/01215.

During automated exchange of a tool, the chuck 44 preferably approaches the magazine from a position in which the chuck cavity 116 and tool shank 114 are substantially axially aligned. During the approach, alignment surfaces 120 on the exterior of the chuck 114 and 30,32,34 on the storage port come into engagement to cause the storage port 12 to move relative to the housing 10 of the magazine, and to bring the tool shank 44 into register with the chuck cavity 116. Initial engagement is between the alignment surface 120 on the chuck 114 and alignment surface 30, which is the interior wall of the slightly wider diameter opening, at the mouth of the storage port 12. The clearance between the pair of alignment surfaces 30,120 is relatively large, so that the alignment between the tool shank 44 and chuck cavity which is achieved as a result is relatively coarse. Further insertion of the chuck 114 within the storage port is guided by a further alignment surface in the form of an internal chamfer 32 which co-operates with the alignment surface 120 to bring a further pair of alignment surfaces, provided by the alignment surfaces 34 and 120, approximately into register whereupon continued relative motion of the chuck 114 and storage port 12 causes mutual engagement of the alignment surfaces 34 and 120. Because the clearance between the alignment surfaces 34,120 is preferably equal to, and more preferably less than the clearance between the tool shank 44 and the interior wall 118 of the chuck cavity 116 when the wall 118 is in its undeflected state, once alignment surfaces 34,120 are engaged, further movement of the chuck will cause insertion of the tool shank 44 into the cavity. The actuating mechanism (not shown) then increases the hydraulic pressure within the annular chambers 120, causing frictional engagement between the tool shank 44 and the wall of the cavity 116, thereby retaining the tool 40 within the chuck 114.

Because the storage port 12 is mounted on the base 10 in a manner which permits both pivoting and lateral motion with two degrees of freedom, the storage port 12 will, upon initial insertion of the spindle nose 114 within the mouth of the port 12, adopt the appropriate angular attitude and lateral displacement, as illustrated, for example, in FIG. 1B, where the storage port 12 has translated in the -Y direction. This accommodates any slight misalignment which may occur as a result of the chuck 114 being positioned, or oriented, imprecisely at the initial stages of the tool-change operation.

In a preferred form of this embodiment, a further alignment surface is provided in the form of a chamfer 122 at the base of the chuck 114, and this further alignment surface co-operates, inter alia with the surface 34 during tool changing to bring the alignment surfaces 30, 120 into engagement.

A further independent aspect of the present invention disclosed in conjunction with this embodiment is a machine tool spindle having a chuck integrally formed therewith, the chuck having a cavity into which a tool unit may be inserted, and one or more fluid chambers located within its body and adjacent an interior wall of the cavity, wherein the interior wall of the cavity is elastically deformable as a result of pressure within one or more of the chambers to enable the interior wall of the cavity to retain a tool by virtue of frictional engagement between a shank of the tool and the interior wall of the cavity.

Figure 3:
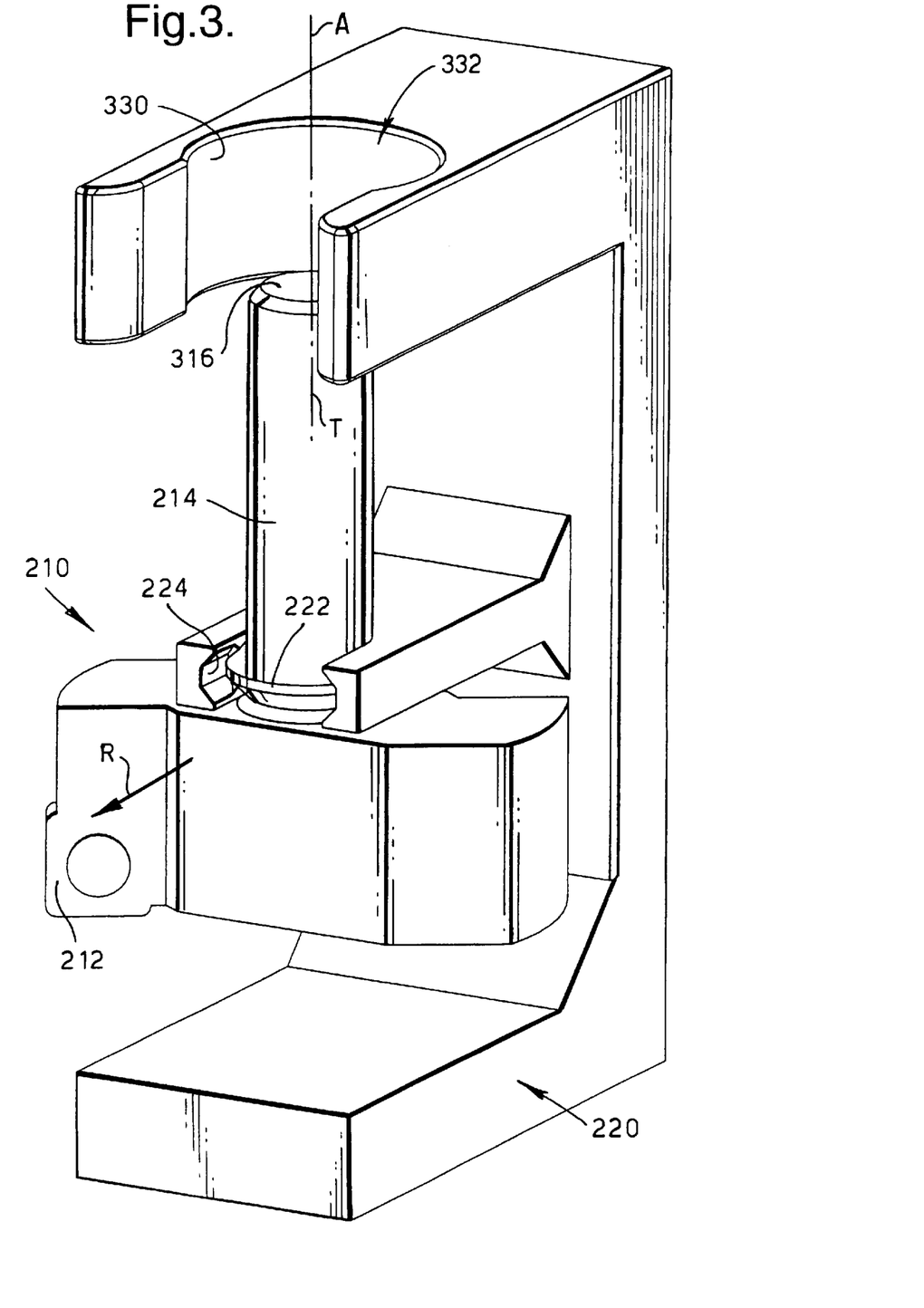
FIG. 3 is a perspective view of a second embodiment of magazine according to the present invention.

A further embodiment of magazine will now be described with reference to FIG. 3. Referring now to FIG. 3, a tool 210 has a cutting element 212 which is integral with a shank 214. The cutting element 212 is a fly cutter, and has a diameter which is substantially larger than the tool shank 214. The tool is both located and retained in a storage port 220 of a magazine by virtue of the engagement of a flange 222, situated at the base of the tool shank 214, within a pair of retaining jaws 224 in the storage port 220. The configuration of the flange 222 and the jaws 224 is such that the tool may be released from the storage port 220 by motion in a direction indicated by the arrow R, in FIG. 3. The storage port 220 is typically one port of a magazine having a plurality of storage ports, each mounted on a base via a compliant mounting device, which will subsequently be described in detail, and which provides motion of the storage port 220 with at least two rotational and two linear degrees of freedom relative to the part of a machine tool on which the magazine is situated.

The storage port 220 has an interior cylindrical alignment surface 330, which defines a partly cylindrical aperture 332. The relative translational displacement and angular alignment (or attitude) of the locating jaws 324 and the axis A of the alignment surface 330 is precisely known, so that when the tool sits in the jaws 324, alignment of a chuck in the spindle with the axis of the locating surface 330 will result automatically in the chuck having a precise and predetermined alignment relative to the tool shank 214 to within a required accuracy. Preferably, the axis T of the tool shank 214 will be coaxial with the axis A of the alignment surface 330 when the tool 210 is engaged with the jaws 224, although this is not essential. The function of the alignment surface 330 is to engage with a corresponding alignment surface 354 on the chuck, in order to bring the tool shank 214 into register with the chuck cavity and thereby enable its insertion.

Figure 4:
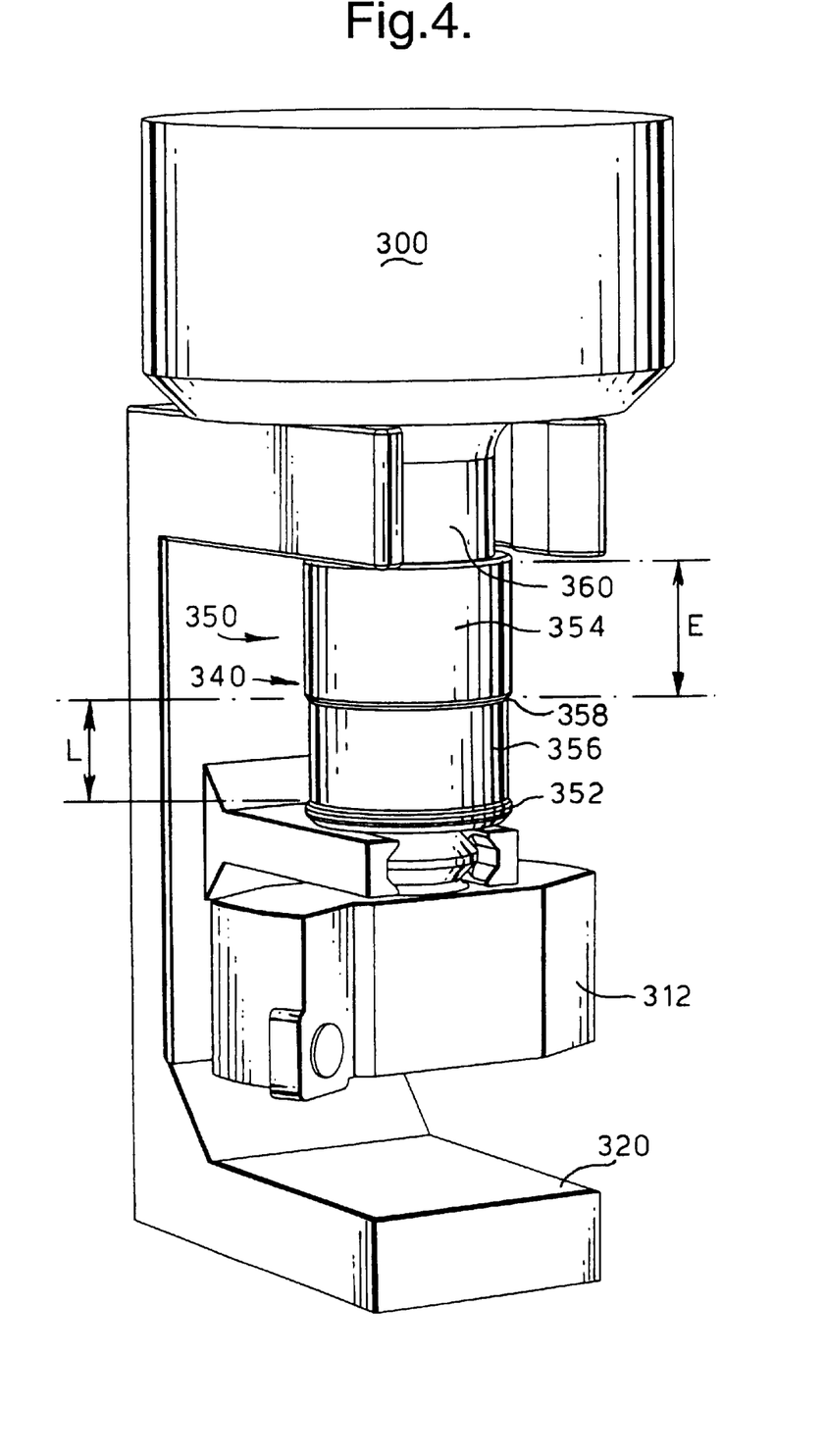
FIG. 4 is a perspective view of a tool changing operation with the magazine of FIG. 3.

Referring now additionally to FIG. 4, the chuck 340 mounted to the spindle 300 of a machine tool in which the tool 310 is to be used has an alignment collar 350 which extends around the chuck 340, and in this example is mounted coaxially therewith, although this is not essential. The alignment collar 350 has a carefully configured outer surface profile which comprises: an alignment surface 352 at its lower end, which is a section of a sphere, and which has a diameter that is smaller than the inner diameter of the alignment surface 330 by an amount equal to approximately one hundredth of the diameter of the tool shank 214; and an external cylindrical alignment surface 354 at its upper end, having a diameter which is smaller than the inner diameter of the alignment surface 330 by an amount roughly equal to the clearance between the tool shank 214 and the interior wall of the chuck cavity when undeformed. Between the alignment surfaces 352,354 lie an intermediate cylindrical alignment surface 356, whose diameter is narrower than that of the alignment surface 354, and a transitional alignment surface 358, which tapers from the diameter of the cylindrical alignment surface 354 down to the diameter of the intermediate cylindrical alignment surface 356.

During engagement of the tool 310 with the chuck 340, the chuck 340 approaches the storage port 320 substantially along the axis A of the alignment surface 330. For the purposes of this example, it will be assumed that during this approach the chuck cavity in which the tool shank 312 is to be inserted does not lie exactly in register with the tool shank 312 (and thus the storage port in which the tool is retained). Initially, the alignment surface 352 comes into contact with the upper mouth of the interior alignment surface 330 on the storage port 320. During this contact, continuing axial motion of the chuck 340 relative to the storage port 320 while the alignment surfaces 352,330 are in contact causes the alignment collar 350 to exert forces on the storage port 320. The configuration of the alignment surface 352 is such that these forces will result in translation of the storage port 320 (by virtue of its compliant mounting, (which will be described later), so that the alignment surface 352 on the collar 350 can enter the part cylindrical aperture 332 defined by the alignment surface 330 on the storage port 320.

As the chuck 340 moves further down and the alignment surface 352 enters inside the aperture 332, the alignment surface 356 may, depending on the degree of mutual misalignment, come into contact with the mouth of the aperture 332. As the alignment collar 350 passes through the aperture 332 provided by alignment surface 330, any contact between the intermediate surface 356 and the mouth of the aperture 332 causes an adjustment of the attitude of the storage port 320 (by virtue of the compliant mount), such that, in the present example, the spindle axis and the axis A of the alignment surface 330 are brought into approximate coincidence. The function of the alignment surfaces 330 and 352, 356 is thus to bring the position and attitude of the chuck 340 and storage port 320 approximately into register, and to maintain this condition during engagement of the two alignment surfaces 330, 354. The accuracy of this relatively coarse alignment is determined (for a given set of relative diameters of the surfaces 352, 356 and 330 respectively) by the axial length L of the alignment collar from the point of intersection of the intermediate 356 and transitional alignment surfaces 358 to the surface 352.

The two sets of alignment surfaces 330,354 are finally brought into mutual engagement during further downward motion of the chuck 340, following further minor translations and adjustments in attitude of the storage port 320 resulting from forces exerted intially on the mouth of the aperture 332 by the tapered transitional alignment surface 358 on the alignment collar 350, and subsequently forces exerted between the surfaces 330 and 354. The axial extent E of the alignment surface 354 is preferably at least half as large as its diameter, this being a recognised condition for avoiding jamming of two sliding components having a relatively small clearance.

Shortly after the surfaces 330,354 have come into mutual engagement, and thus brought the tool shank 214 and chuck cavity sufficiently into register to enable insertion of the tool into the chuck 340, the tool shank 214 starts to enter the chuck cavity. Depending upon the configuration of the tip of the tool shank 214 and the mouth of the chuck cavity, this process may also serve to provide any final minor adjustments in the relative alignment of the chuck 340 and the tool shank 214. When the downward motion of the chuck has been completed, and the tool has been completely inserted into the chuck, the alignment surface 354 passes out of the aperture at the open mouth of the jaws on which the alignment surface 330 is situated. The tool may then be removed from the magazine by moving the spindle in the direction of the arrow R, such a movement being permitted by the narrower diameter part 360 at the top of the chuck 340.

Figure 5:
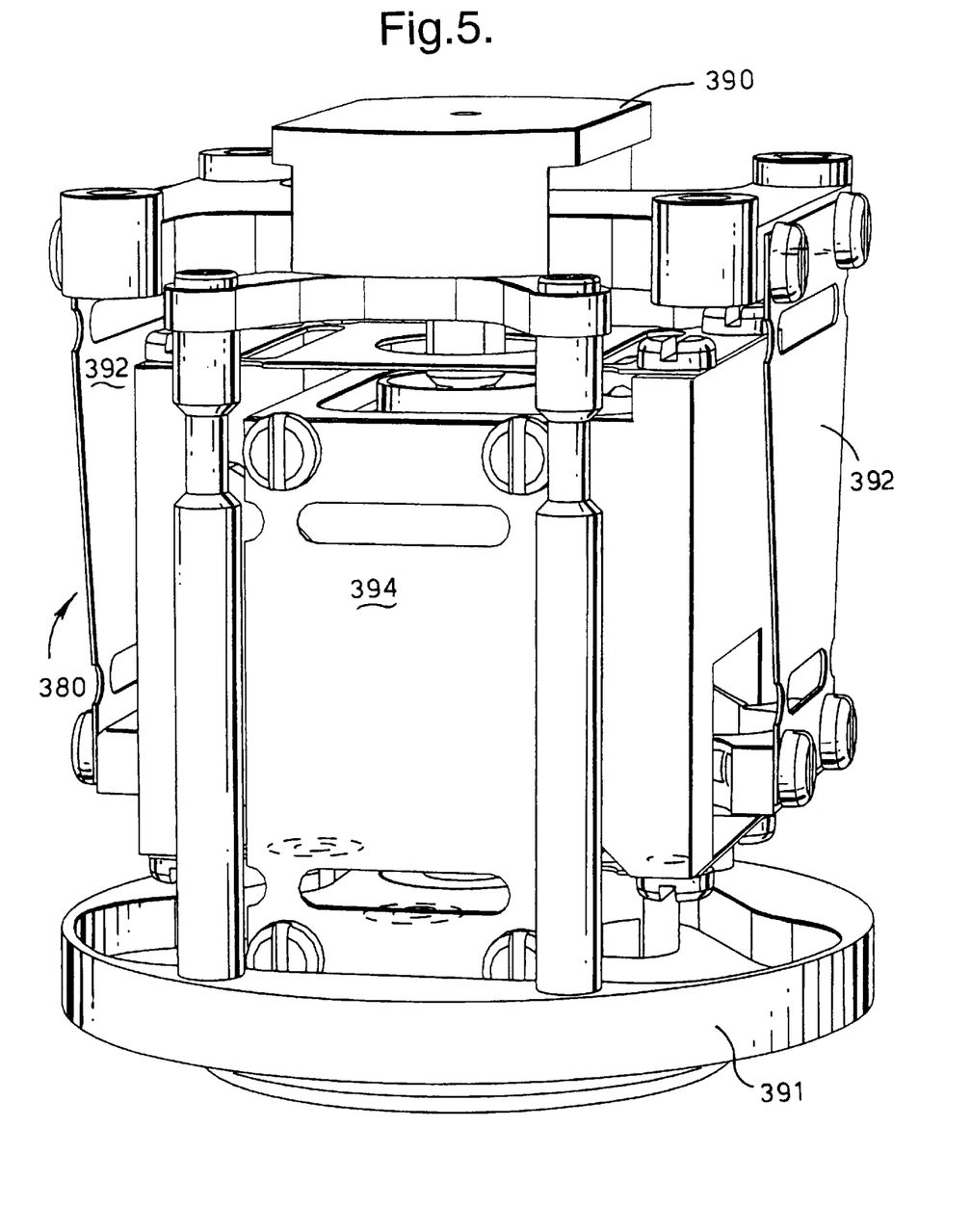
FIG. 5 is a perspective view of a mounting of the magazine of FIGS. 3 and 4.

Referring now to FIG. 5, the storage port 320 is situated on a compliant mount 380. The mount 380 includes an upper platform 390 on which the storage port is mounted. The upper platform 390 is supported in a manner which enables it to move with two degrees of linear freedom and two degrees of rotational freedom relative to a lower platform 391 which, in use, is fixed to the base of the machine tool on which the magazine is situated. The suspension system which provides these degrees of freedom is two pairs 392,394 of serially mounted substantially parallel leaf springs. The separation between the leaf springs in a given pair 392,394 is greater at their lower ends than at their upper ends, such that in section they have what is more accurately described as a trapezoidal configuration. As a result, the upper platform 390 undergoes a change in attitude simultaneously with any linear displacement thereof, describing an arc in two non-parallel planes about a point above the upper platform 390. The upper platform 390, and thus the storage port 320 mounted on it, has the requisite number of degrees of freedom to enable a tool to be brought into register with a chuck by engagement of co-operating surfaces on the chuck and the magazine.

Preferably, the upper tip 316 (see FIG. 3) of the tool shank is positioned substantially at or below the centre of the arcuate motion which the upper platform executes in each of the two orthogonal planes as a result of the configuration of the planar spring suspension mechanism. In this way, adjustment of the attitude of the tool will not significantly alter significantly its linear displacement at the upper tip of the tool shank, where the tool and chuck cavity first come into contact.

In the embodiment described above, the upper tip 316 of the tool shank 314 is shaped in the standard manner, i.e. with a small chamfer, and alignment of the tool shank 314 and the chuck 340 is achieved by co-operation between one or more surfaces on the outer surface of the chuck 340 and the storage port 320. It is however possible to achieve alignment by configuring the upper tip 316 of the tool shaft in such a way that initial engagement of the upper tip 316 with the mouth of the spindle cavity causes automatic alignment, without the need for specially configured surfaces on the outer surface of the chuck and/or the storage port.

Figure 6:
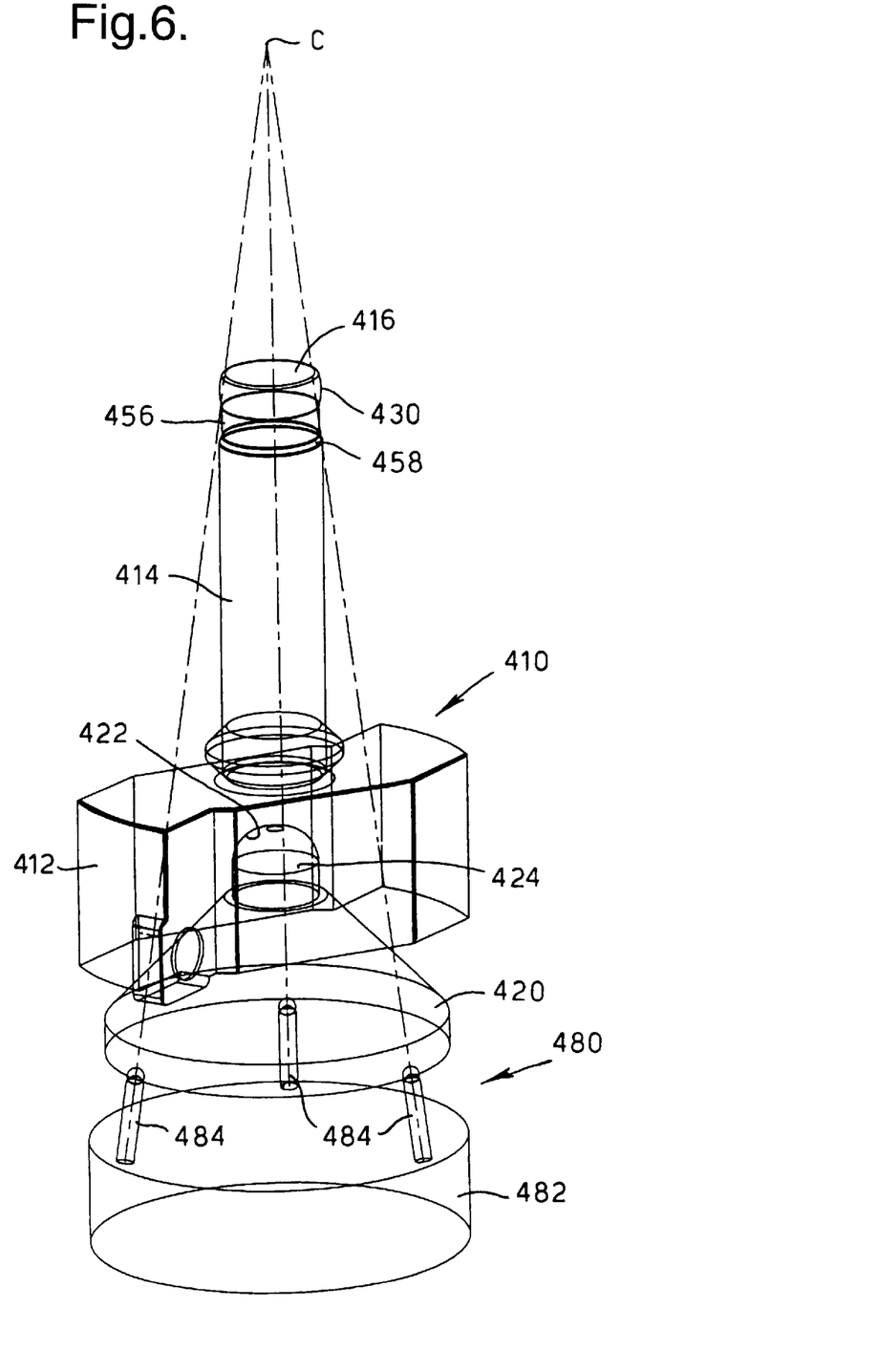
FIG. 6 is a perspective view of a third embodiment of magazine according to the present invention.

Referring now to FIG. 6, a tool 410 is stored for use on a machine tool in a storage port 420 of a magazine. The storage port 420 is supported on a base 482 via a compliant mount 480 which enables the storage port 420 to move with five degrees of freedom relative to the base 482, which, in use, is fixedly mounted to a part of a machine tool. The mount 480 comprises three elongate resilient struts 484, which are substantially stiff in tension and compression along their length, and permit bending in all other senses. The compliant mount 480 thus provides an arcuate motion of the storage port 420 about a centre C of motion. The tool is located in the port 420 by the engagement of a spigot 424 on the port 420 within an aperture 422 in the base of the cutting element 412 of the tool 410. The upper end 416 of the tool shank 414 has a part-spherical portion 430 at its upper tip, from which extends a cylindrical portion 456 of a relatively small diameter, and a transitional taper portion 458 extending from the small diameter cylindrical portion to the standard parallel-sided tool shank 414.

Figure 7A:
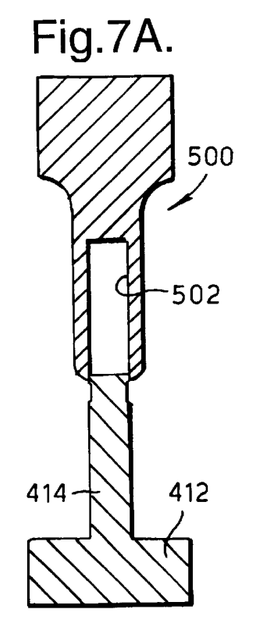
FIGS. 7A and B are sections through the tool of FIG. 6 during a tool change operation.
Figure 7B:
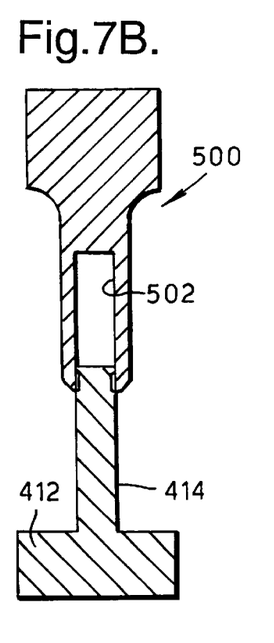
Figure 8A:
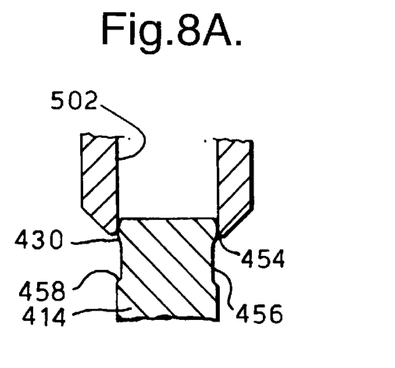
FIGS. 8A and B are details of FIGS. 7A and B.
Figure 8B:
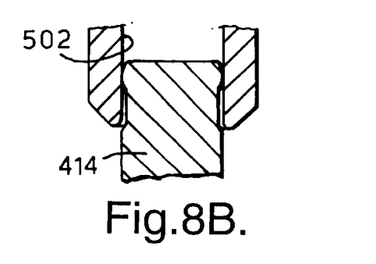

Engagement of the tool within the chuck cavity is illustrated in FIGS. 7 and 8. In this embodiment, the initial approximate location of the tool with respect to the chuck 500 occurs by virtue of interaction between the part-spherical portion 430 at the upper end of the tool tip 416 and the small chamfer 454 provided at the interior of the mouth of the chuck cavity 502. Entry of the part-spherical 430 portion within the chuck cavity 502 occurs once mutual engagement of the part-spherical surface 430 and the chamfer 454 at the mouth of the chuck cavity 502 (during downward motion of the chuck 500) has caused the upper end 416 of the tool to translate into register with the chuck cavity 502, by virtue of resultant motion of the compliant mount 480. Further downward motion of the chuck 500 will (if the extent of mutual misalignment is sufficiently large) bring the smaller diameter cylindrical portion 456 into contact with the mouth of the chuck cavity 502, and then subsequently the transitional taper portion 458. Such contact, together with continued downward motion of the chuck, will, as in the case of the first embodiment, eventually cause the tool 410 to adopt approximately the same attitude and the same linear displacement as the chuck 500. Downward motion once the mouth of the chuck cavity 502 is in contact with the taper portion 458 will rotate the tool into a sufficiently accurate alignment that the parallel-sided tool shank 414 can enter the chuck cavity 502 without jamming.

This embodiment has the advantage of a relatively simpler construction of magazine and chuck, since no alignment surfaces are required either on the storage port 420 or on the outer surface of the chuck 440. However, in this embodiment each tool shank 414 requires a specially configured upper end 416, and so this embodiment may be less appropriate in instances where large tool suites are required.

Figure 9A:
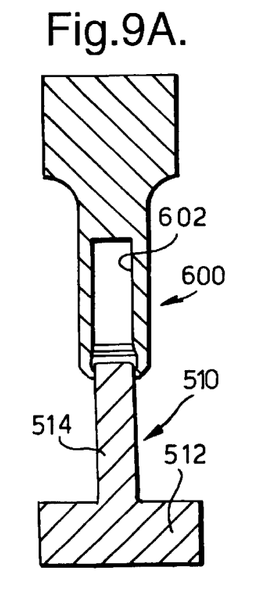
FIGS. 9A and B are sections through a further configuration of tool and chuck cavity during a tool change operation.
Figure 9B:
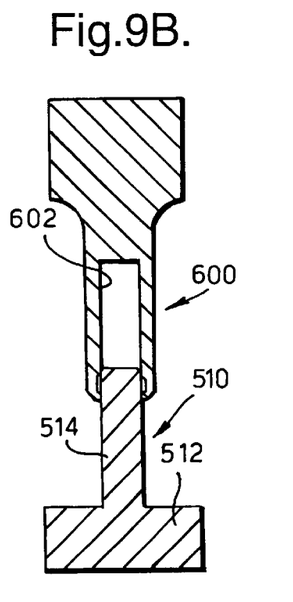
Figure 10A:
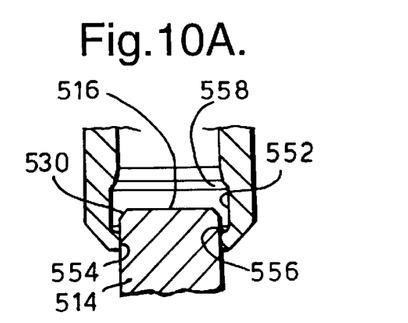
FIGS. 10A and B are details of FIGS. 9A and B.
Figure 10B:
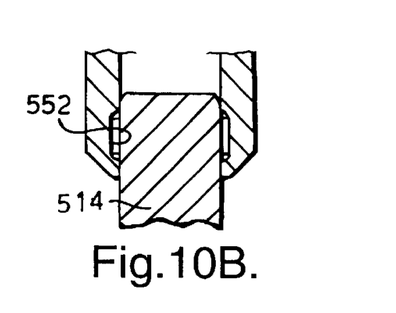

An alternative embodiment will now be described with reference to FIGS. 9 and 10, in which the upper tip of the tool shank has a standard chamfer. As in the previous embodiment, the tool 510 is supported on a compliant mount (not shown) of the type illustrated in FIG. 6. The upper tip 516 of the tool shank 514 has a standard configuration, and therefore terminates in a small chamfer 530. The chuck cavity 602 terminates, at its lower end in a series of surface configurations, including a pair of coaxial cylindrical alignment surfaces 552, and 554, and a pair of adjacent transitional alignment surfaces 556, 558 which lead into the cylindrical interior cavity 602 of the chuck in which the tool 510 is retained during machining. Engagement of the tool within the chuck cavity is as described in the previous embodiment, with the surfaces at the interior of the mouth of the chuck cavity co-operating with the chamfer on the upper tip 516 of the tool shank 514 to align the tool and chuck cavity 602 by virtue of motion of the tool permitted from movement of the compliant mount.

This embodiment has the advantage of operating with tools having a standard configuration of shank, although it should be noted for optimum performance that, because the material from which the tool shank is made is substantially harder than that of the chuck, the chamfers on the tool shank should preferably be of high quality, with blended edges, since any sharp edges will, in the event of a sufficiently large misalignment, bite into the material from which the chuck is formed and cause jamming of the tool in the chuck.

In each of the preferred embodiments described herein, surfaces on the tool shank or the storage port co-operate with one or more surfaces which are connected to the chuck to cause the tool to become aligned (by virtue of relative motion of the tool and the storage port) with the chuck cavity, and thereby enable the tool subsequently to be inserted into the chuck cavity. Upon insertion of the tool, actuation of the hydraulic clamping mechanism will cause the interior walls of the cavity to engage the shank of the tool and thereby retain the tool in the chuck cavity.

Aspects of the present invention have been illustrated herein using an example of tool changing on a machine tool. However, the automated exchange provided by the present invention has wider applicability to other fields of use, such as for changing probes on a coordinate measuring machine, or end effectors on a robot, for example. Further, the mechanism by which frictional engagement between the tool and the cavity in the spindle is actuated is not limited to hydraulic means of actuation, and any other suitable means may be employed, such as shrink fit mechanisms which operate thermally, for example. Nor is the applicability of the present invention limited to use in conjunction with frictional clamping devices; all disclosed embodiments of the present invention may be employed in conjunction with any changing device in which an operating module is to be inserted into an aperture with a relatively tight tolerance.

It should be noted that, although all of the embodiments disclosed provide relative motion between (in the example of a machine tool) the tool and the spindle cavity during tool changing by supporting the tool magazine on a compliant mount, it is equally possible to provide such relative motion during tool changing by allowing the part of the spindle in which the cavity is provided to move relative to a tool which is stored in a magazine fixedly located on the coordinate positioning machine, thereby to achieve the requisite relative alignment. Such an arrangement would be particularly, but not exclusively appropriate for changing end effectors on a robot wrist. Alternatively, both the tool and the spindle could be mounted with one or more degrees of freedom of motion.

The different features of the invention described above are not necessarily limited to their association with the embodiments in connection with which they were described. Many aspects of the invention are generally applicable to other embodiments of the invention described herein.

What is claimed is:

1. A magazine for storing operating modules on a coordinate positioning machine to enable automated exchange of one operating module for another, the magazine having a base, by means of which it may be mounted to the machine, and at least one storage port containing an operating module, the storage port being mounted to the base by a compliant mount which provides at least two degrees of rotational freedom and permits motion with two translational degrees of freedom of the storage port relative to the base of the magazine, thereby to enable the operating module within the storage port to adopt an attitude required to enable its insertion in a chuck cavity during exchange of operating modules.

2. A magazine according to claim 1 wherein the compliant mount is provided by a plurality of resilient members.

3. A magazine according to claim 1 wherein the compliant mount is provided by a pair of serially mounted gimbals.

4. A magazine according to claim 3 wherein the gimbals are ball joints.

5. A coordinate positioning machine having a magazine for storing operating modules on a coordinate positioning machine to enable automated exchange of one operating module for another, the magazine having a base, by means of which it may be mounted to the machine, and at least one storage port containing an operating module, the storage port being mounted to the base by a compliant mount which provides at least two degrees of rotational freedom and permits motion with two translational degrees of freedom of the storage port relative to the base of the magazine, thereby to enable the operating module within the storage port to adopt an attitude required to enable its insertion in a chuck cavity during exchange of operating modules, the machine having a chuck which has a cavity for receiving the operating module and for retaining the operating module, the chuck and the storage port being moveable relative to each other, wherein mutually engageable alignment surfaces are connected to the chuck and to the storage port, the alignment surfaces being engageable as the chuck and the storage port approach during an exchange operation to cause the operating module within the storage port and the chuck cavity to come into register by virtue of relative motion between the storage port and the base permitted by virtue of the compliant mount.

6. A coordinate positioning machine according to claim 5 wherein the alignment surfaces are provided on the operating module and the mouth of the chuck cavity.

7. A coordinate positioning machine according to claim 5 wherein the alignment surfaces are on the outside of the chuck and the storage port.

8. A coordinate positioning machine according to claim 5 comprising two pairs of alignment surfaces, a first pair of surfaces being mutually engageable to provide a relatively coarse degree of alignment between the operating module and the chuck cavity, and a second pair of surfaces which are mutually engageable subsequent to engagement of the first pair of surfaces to provide a relatively fine degree of alignment between the operating module and the chuck cavity.

9. A coordinate positioning machine according to claim 8 wherein a single alignment surface serves as an alignment surface of both the first and the second pair of alignment surfaces.

10. A method of operating a coordinate positioning machine having a chuck supported on a first moveable part of the machines, which has a cavity within which an operating module may be releasably retained, and a magazine supported on a second part of the machine relatively moveable with respect to the first part having at least one storage port containing an operating module, the method comprising the steps of:

operating the machine to cause the magazine and chuck to approach, and during the approach, engaging mutually engageable alignment surfaces on the chuck and the storage port;

allowing the storage port to move relative to the first moveable part of the machine as a result of forces exerted by engagement of the alignment surfaces during the approach, thereby to bring the operating module and the chuck into a predetermined alignment;

operating the machine to move the first and second relatively moveable parts to insert the operating module within the cavity;

subsequent to the insertion of the operating module within the cavity, causing the cavity wall to grip the operating module and thereby retain the operating module within the chuck by virtue of frictional engagement between the operating module and the cavity wall; and with the operating module retained within the chuck, operating the machine to move the first and second relatively moveable parts to remove the operating module from the storage port.

* * * * *